US008648850B2

(12) United States Patent
Kim

(10) Patent No.: US 8,648,850 B2
(45) Date of Patent: Feb. 11, 2014

(54) METHOD AND APPARATUS FOR COMPENSATING FOR DISPLAY DEFECT OF FLAT PANEL DISPLAY

(75) Inventor: Hye Jin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1563 days.

(21) Appl. No.: 11/967,974

(22) Filed: Dec. 31, 2007

(65) Prior Publication Data

US 2008/0238936 A1 Oct. 2, 2008

(30) Foreign Application Priority Data

Apr. 2, 2007 (KR) ........................ 10-2007-0032389

(51) Int. Cl.
*G09G 5/00* (2006.01)
*G06F 3/038* (2013.01)

(52) U.S. Cl.
USPC ........................................... 345/214; 345/618

(58) Field of Classification Search
USPC ........... 345/618, 204, 690, 692, 694, 214, 87, 345/89; 348/189, 191
See application file for complete search history.

(56) References Cited

U.S. PATENT DOCUMENTS

2003/0016201 A1* 1/2003 Ayres et al. ..................... 345/98
2006/0007196 A1* 1/2006 Chen ............................ 345/204

FOREIGN PATENT DOCUMENTS

CN 1750089 A 3/2006
JP 09-318929 12/1997
JP 2000-066634 3/2000
JP 2003-280619 10/2003
JP 2006-058870 3/2006
JP 2006-084729 3/2006

OTHER PUBLICATIONS

Office Action issued in corresponding Japanese Patent Application No. 2007-338023, mailed Feb. 22, 2011.
Office Action issued in corresponding Taiwanese Application No. 096150944, mailed Jul. 10, 2012.

* cited by examiner

*Primary Examiner* — Jonathan Horner
(74) *Attorney, Agent, or Firm* — Brinks, Gilson & Lione

(57) ABSTRACT

A method and apparatus for controlling picture quality of a flat panel display capable of electrically compensating for a display defect of a display panel are disclosed. The method of compensating for a display defect of a flat panel display includes reading identification information of a display panel; generating positional information indicating the position of the display defect and the form of the display defect of the display panel on the basis of first input information and the identification information; generating a compensation value for compensating the degree of the display defect of on the basis of second input information; storing the positional information and the compensation value in a memory; and reading the positional information and the compensation value from the memory, modulating data to be displayed at the position of the display defect of the display panel by the compensation value, and displaying the modulated data on the display panel.

18 Claims, 12 Drawing Sheets

METHOD AND APPARATUS FOR COMPENSATING FOR DISPLAY DEFECT OF FLAT PANEL DISPLAY

CLAIM FOR PRIORITY

This application claims the benefit of Korean Patent Application No. P2007-032389, filed on, which is hereby incorporated by reference as if fully set forth herein.

BACKGROUND

1. Field of the Invention

The present invention relates to a flat panel display, and more particularly, to a method and apparatus for controlling picture quality of a flat panel display capable of electrically compensating for a display defect which appears on a display panel.

2. Discussion of the Related Art

Examples of a flat panel display include a liquid crystal display (LCD), a field emission display (FED), a plasma display panel (PDP) and an organic light emitting diode display (OLED), most of which have been put to use and are commercially available.

Since the LCD satisfies trends of electronic appliances such as lightness, thinness, compactness and smallness and has excellent mass productivity, cathode ray tubes have been rapidly replaced with LCDs.

In particular, an active matrix type LCD which drives liquid crystal cells using thin film transistors (hereinafter, referred to as “TFTs”) has excellent picture quality and low power consumption and has been rapidly developed to realize a high resolution and increase in screen size of a device by a recent mass production technology and the results of research and development.

In most of the flat panel displays, a photolithography process is used in a manufacturing process for patterning fine signal lines or electrodes of a pixel array. The photolithography process includes exposure, development and etching processes.

In the photolithography process, due to variation in an amount of exposure light, a display defect (display spot) having brightness and chromaticity different from those of a normal display surface may appear in a process of testing a completed display panel. The display defect is caused by an overlapping area between a gate and a drain of a TFT, the height of a spacer, parasitic capacitance between signal lines, and parasitic capacitance between the signal line and a pixel electrode, which become different from those of the normal display surface due to the variation in amount of exposure light in the photolithography process.

FIGS. 1 and 2 are respective views showing cases where a vertical line defect and a horizontal line defect are included in the display defect.

As shown in FIGS. 1 and 2, an exposure apparatus used in a process of simultaneously forming a plurality of pixel arrays A1 to A18 or B1 to B6 on a large mother substrate includes a multi-lens in which a plurality of lenses 10 are arranged in two rows and overlap each other with a predetermined width GW. In the pixel arrays A1 to A18 or B1 to B6, a plurality of data lines and a plurality of gate lines intersect each other, TFTs are formed at the intersections, and pixel electrodes are arranged in a matrix. In the pixel arrays A1 to A18 or B1 to B6, columnar spacers for holding a cell gap may be formed. The pixel arrays A1 to A18 or B1 to B6 are divided by a scribing process. In FIG. 1, arrows and numerals represent scan directions and scan sequences of the lens 10. That is, the multi-lens of the exposure apparatus sequentially exposes the pixel arrays A1 to A18 or B1 to B6 while moving from the right side to the left side, from the left side to the right side, from the right side to the left side after moving upward, from the left side to the right side, from the right side to the left side after moving upward, and from the left side to the right side.

The lenses 10 of the exposure apparatus have respective aberrations and the aberrations of the lenses are different from one another. Accordingly, the amount of received light and the light distribution of photoresist coated on the mother substrate 12 vary according to the positions of the lenses 10 and the overlapping width of the lenses 10. Due to the variation in amount in exposure light of the photoresist according to the positions of the lenses 10 and the overlapping width GW of the lenses 10, the photoresist pattern after the development process varies according to the positions of the lenses 10 and the overlapping width between the lenses 10. As a result, the overlapping area between the gate and the drain of the TFT partially varies in the display surface of the pixel arrays A1 to A18 or B1 to B6, a pixel voltage varies according to the positions of the display surface, the heights of the columnar spacers of the pixel arrays A1 to A18 vary according to the positions of the display surface, and the cell gap partially varies. When all the manufacturing processes are completed after scribing the pixel arrays A1 to A18 or B1 to B6 and the same data is applied to all the pixels of the flat panel display, the display defect appears in the form of the vertical line or the horizontal line. The display defect appears to extend in a movement direction of the multi-lens of the exposure apparatus, and the vertical line and the horizontal line vary according to the movement direction of the multi-lens 10 or the arrangement direction of the pixel arrays A1 to A18 or B1 to B6 arranged on the mother substrate 12. For example, if 18 small pixel arrays A1 to A18 are vertically arranged on the mother substrate 12 as shown in FIG. 1, vertical lines appear in the pixel arrays A1 to A18. As shown in FIG. 2, if six middle/large pixel arrays B1 to B6 are horizontally arranged on the mother substrate 12, horizontal lines appear in the pixel arrays B1 to B6.

The display defect appears to extend in the movement direction of the multi-lens of the exposure apparatus in the form of the vertical line or the horizontal line, and the vertical line and the horizontal line vary according to the movement direction of the multi-lens or the arrangement direction of the pixel arrays arranged on the mother substrate.

In order to solve the display defect in the form of the vertical line or the horizontal line, conventionally, a method of examining precision of a photomask to improve the mask or regulate the arrangement of the multi-lens has been used. However, a phenomenon that the vertical line or the horizontal line appears cannot be prevented by this method. In order to overcome the limitation of the prior art, the present applicant suggested a method of selecting data to be displayed in a display defect region and compensating for the brightness of the display defect region by the modulation of the data, which is disclosed in Korean Patent Application No. 10-2006-0059300.

However, since the vertical line defect and the horizontal line defect have different brightness distributions, it is difficult to compensate for the brightnesses of the defects, which appear in different forms, by a method for compensating for a defect which appears in any one form.

SUMMARY

A method of compensating for a display defect of a flat panel display is disclosed, the method including: reading identification information of a display panel; generating positional information indicating the position of the display defect and the form of the display defect of the display panel on the basis of first input information and the identification information; generating a compensation value for compensating the degree of the display defect on the basis of second input information; storing the positional information and the compensation value in a memory; and reading the positional information and the compensation value from the memory, modulating data to be displayed at the position of the display defect of the display panel by the compensation value, and displaying the modulated data on the display panel.

In another aspect, there is provided an apparatus for compensating for a display defect of a flat panel display, the apparatus including: a display panel; a program executer which reads an identification information of the display panel, generates positional information indicating the position of the display defect and the form of the display defect of the display panel on the basis of first input information and the identification information, and generates a compensation value for compensating the display defect of the display panel on the basis of second input information; a memory which stores the generated positional information and the compensation value; a compensation unit which reads the information from the memory and modulates data to be displayed at the position of the display defect by the compensation value; and a driving unit which displays the data adjusted by the compensation value on the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

Hereinafter, a liquid crystal display according to preferred embodiments of the present disclosure will be described with reference to FIGS. 3 to 12.

Display defects, which occur due to a failure in a process of manufacturing a panel, are similar in the form of a display defect or an occurrence position, according to a cause thereof. For example, a stitch defect appears in an overlapping portion between lenses in the form of a sharp vertical line and a lens defect appears in the overlapping portion between the lenses in the form of a smooth vertical line or horizontal line, according to a lens module map. In addition, the display defects, which occur due to the same cause, have a common pattern, but are slightly different from one another in the form, the position and the level thereof, according to display panels. In order to compensate for the various defects of the display panels, compensation data suitable for the characteristics of the defects of each display panel should be generated and applied.

Figure 1:
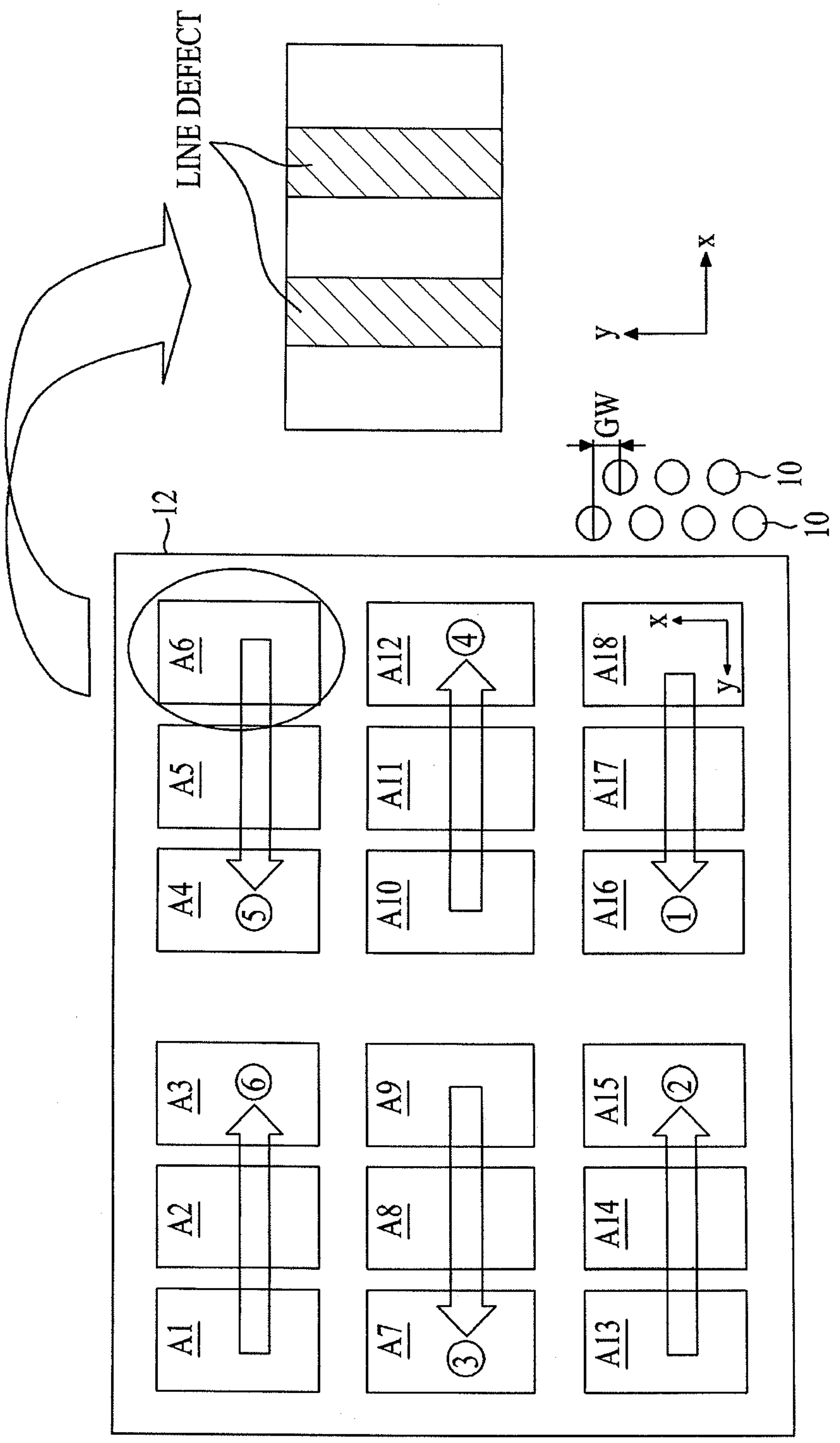
FIG. 1 Related Art
FIG. 1 is a view showing a case where a vertical line defect appears.
Figure 2:
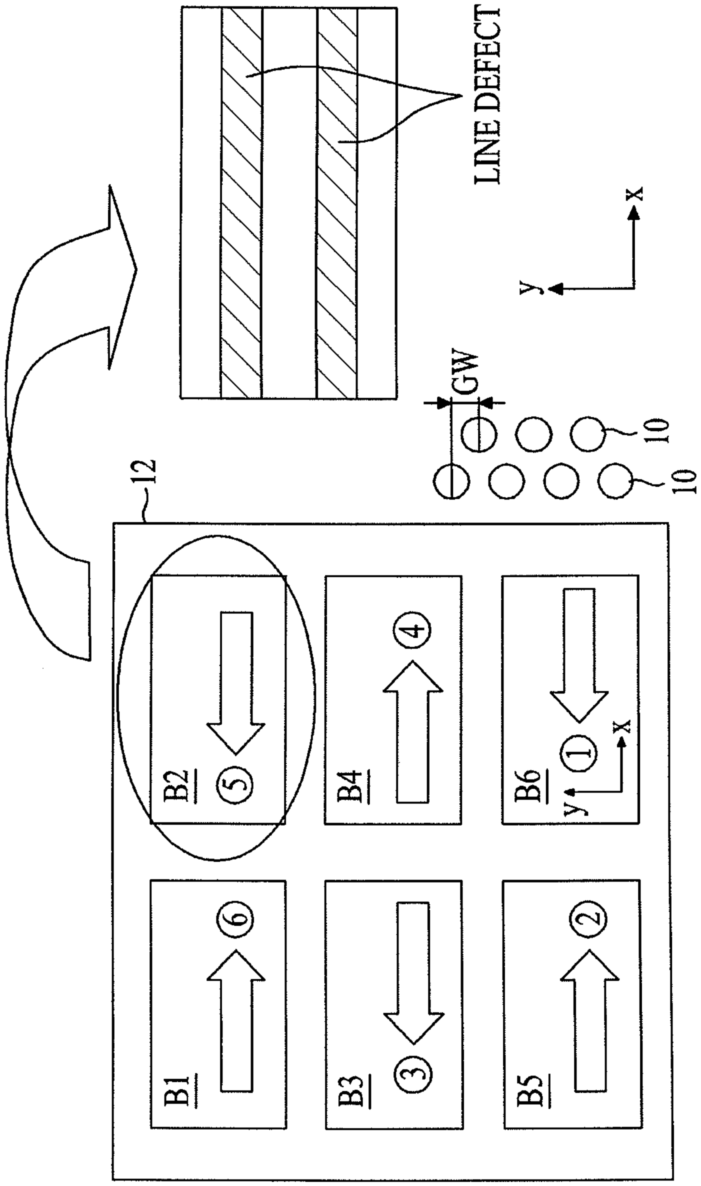
FIG. 2 Related Art
FIG. 2 is a view showing a case where a horizontal line defect appears.
Figure 3:
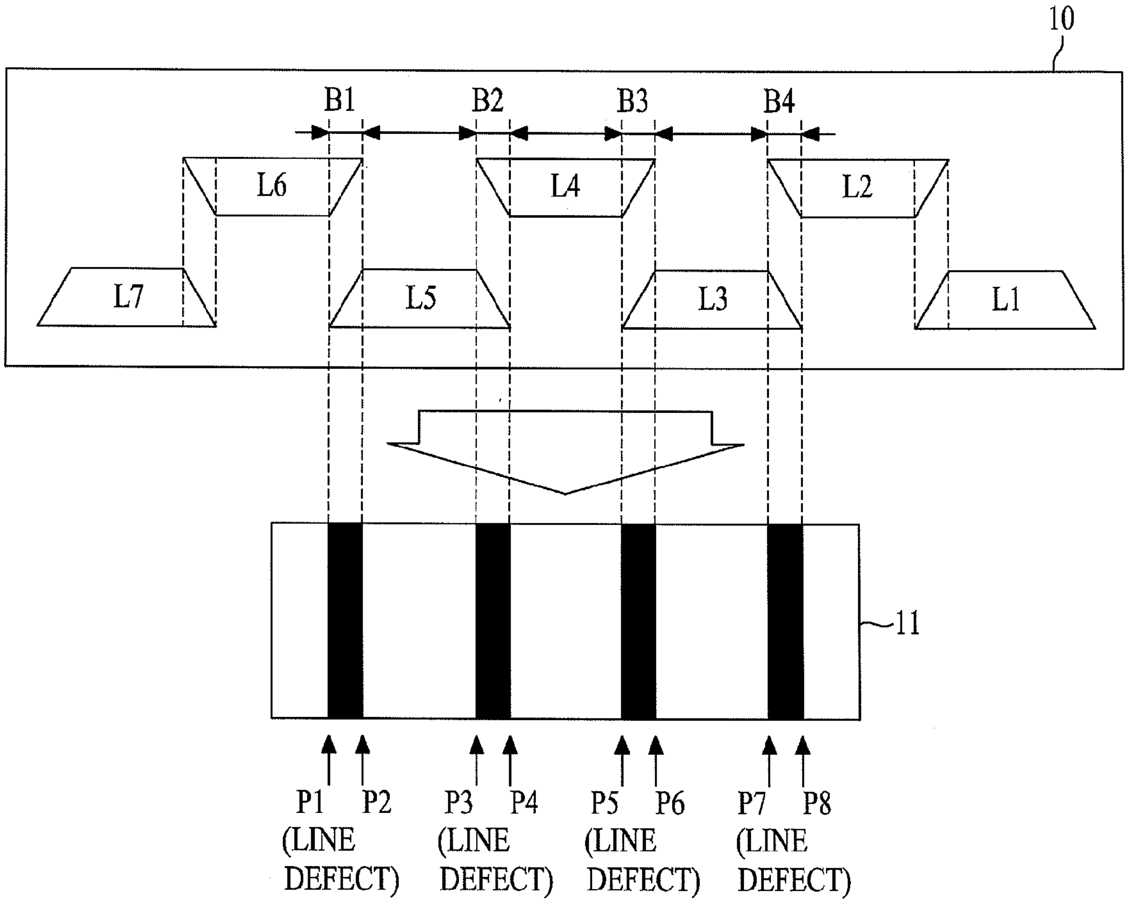
FIG. 3 is a view showing of a lens line defect which appears in a 20.1-inch wide model.

FIG. 3 is a view showing a lens line defect which appears in a 20.1-inch wide model.

Referring to FIG. 3, photoresist formed on a substrate of a display panel 11 is not exposed by a first lens L1 and a seventh lens L7, both of which are located at both edges of a lens assembly 10, among lenses L1 to L7. The photoresist formed on the substrate is exposed by the third to fifth lenses L3 to L5 and is exposed by a half of the second lens L2 and a half of the sixth lens L6.

In a relationship between the lens assembly 10 and the display panel, line defects occur at a first overlapping portion B1 between the fifth lens L5 and the sixth lens L6, a second overlapping portion B2 between the fourth lens L4 and the fifth lens L5, a third overlapping portion B3 between the third lens L3 and the fourth lens L4, and a fourth overlapping portion B4 between the second lens L2 and the third lens L3 in the display panel 11.

Figure 4:
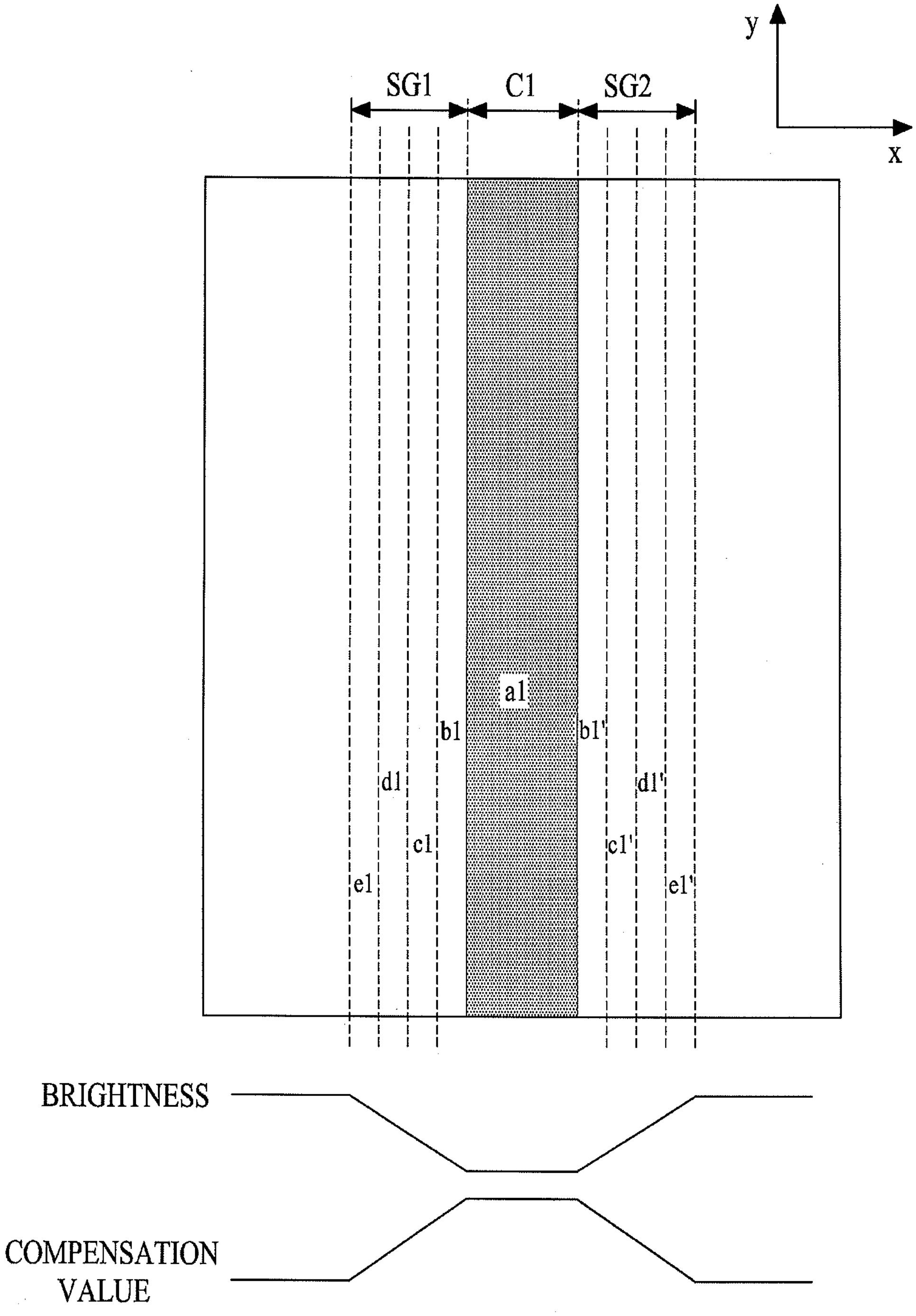
FIG. 4 is a view showing an example of a difference in brightness of a vertical line defect and compensation values applied to the vertical line defect.
Figure 5:
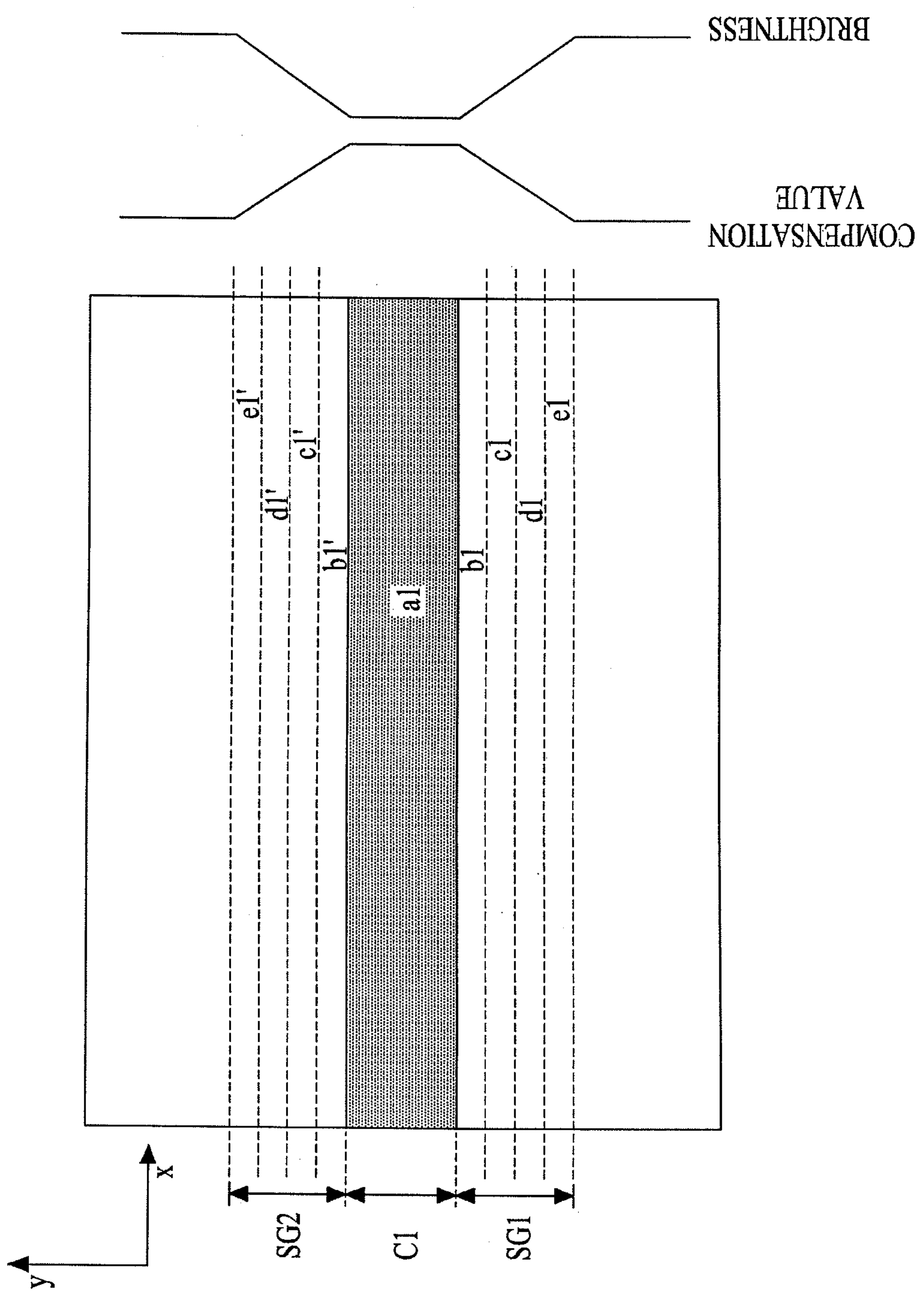
FIG. 5 is a view showing an example of a difference in brightness of a horizontal line defect and compensation values applied to the horizontal line defect.

Reference positions for applying compensation values at the positions where the line defects occur are positions P1 and P2 of the first overlapping portion B1, positions P3 and P4 of the second overlapping portion B2, positions P5 and P6 of the third overlapping portion B3, and positions P7 and P8 of the fourth overlapping portion B4. The line defect and a normal display surface adjacent thereto overlap each other in the brightness. Accordingly, in a brightness pattern of the line defect, the brightness is darkest at a central compensation region C1 and is gradually increased from the central compensation region C1 to both edges, as shown in FIGS. 4 and 5. The compensation value, which is applied to the line defect in order to compensate for the brightness of the line defect, is largest at the central compensation region C1 and is gradually decreased in gradient compensation regions SG1 and SG2 which are located at both edges of the central compensation region C1.

Table 1 shows the coordinates of the actual positions of the lens line defects of respective samples of a 20.1-inch wide model. Lens vertical lines 1 to 8 of Table 1 are samples which are previously set by an experiment according to the positions and the sizes of the defects.

TABLE 1

| Sample | B1 | B2 | B3 | B4 |
|---|---|---|---|---|
| Lens vertical line 1 | | | (974, 992) | |
| Lens vertical line 2 | (216, 242) | | | |
| Lens vertical line 3 | | | | (1426, 1456) |
| Lens vertical line 4 | | | (1144, 1170) | |
| Lens vertical line 5 | | | (974, 1012) | |
| Lens vertical line 6 | | (608, 634) | | |
| Lens vertical line 7 | | (622, 644) | | |
| Lens vertical line 8 | (378, 414) | | | |

Referring to Table 1, in the 20.0-inch wide model, the lens vertical lines 2 and 8 respectively appear at (216,242) and (378,414) in the first overlapping portion B1 and the lens vertical lines 6 and 7 respectively appear at (608,634) and (622,644) in the second overlapping portion B2. The lens vertical lines 1, 4 and 5 respectively appear at (974,992), (1144,1170) and (974,1012) in the third overlapping portion B3 and the lens vertical line 3 appears at (1426,1465) in the fourth portion B4.

The display defect may appear in the form of a horizontal line as well as the form of the vertical line, according to the characteristics of the panel, such as the size and the resolution of the display panel. In the embodiment of the present disclosure, information on divided gray level regions, to which independently apply the compensation values according to directional information of the defect indicating whether the display defect occurs in the vertical direction or the horizontal direction and the level of a failure of the central compensation region with a reference gray level value, is automatically set using identification (ID) of the display panel.

FIG. 4 is a view showing an example of a difference in brightness of the vertical line defect and compensation values applied to the vertical line defect.

Referring to FIG. 4, the brightness of the vertical line defect is darkest at the central compensation region C1 located at the central portion of the vertical line defect in the width direction (x-axis direction) and is gradually increased toward the both edges of the central compensation region C1. In order to compensate for the brightness of the vertical line defect, the compensation value applied to the vertical line defect is largest at the central compensation region C1 and is gradually decreased in the gradient compensation regions SG1 and SG2 located at the both edges of the central compensation region C1.

Since the brightness of the central compensation region C1 does not overlap that of the normal display surface, the central compensation region C1 is darkest and a largest compensation value a1 is applied to the central compensation region C1 in the vertical line defect. The compensation value a1 of the central compensation region C1 is decided to a value for allowing a difference in brightness, between the central compensation region C1 and the normal display surface, to be invisible to the naked eyes, on the basis of a subjective difference in brightness between the central compensation region C1 and the normal display surface sensed by the naked eyes or a brightness measuring apparatus.

The gradient compensation regions SG1 and SG2 are regions in which the brightness of the central compensation region C1 overlaps that of the normal display surface and are located at the left side (SG1) and the right side (SG2) of the central compensation region in the vertical line defect. The brightness of each of the gradient compensation regions SG1 and SG2 is similar to that of the central compensation region C1 at a position close to the central compensation region C1 and is similar to that of the normal display surface at a position close to the normal display surface. That is, the gradient compensation regions SG1 and SG2 darken toward the central compensation region C1 and brighten toward a non-overlapping surface of the normal display surface. Each of the gradient compensation regions SG1 and SG2 is divided into a plurality of sections. Here, the width of each section is defined to a value obtained by converting the width-direction lengths (x) of the gradient compensation regions SG1 and SG2 into the number of pixels and dividing the converted length by a multiple of 4. In the gradient compensation regions SG1 and SG2, compensation values b1 to e1 and b1' to e1' are automatically decided to values which are gradually decreased from a section close to the central compensation region C1 to a section close to the non-overlapping surface of the normal display surface. In other words, when the compensation value a1 of the central compensation region C1 is decided, the compensation values b1 to e1 and b1' to e1' applied to the sections of the gradient compensation regions SG1 and SG2 are automatically decided between the compensation value a1 and '0' and satisfy perfect bilateral symmetry. The number of sections of the gradient compensation regions SG1 and SG2 is increased as the compensation value a1 of the central compensation region C1 is increased and is decreased as the compensation value a1 of the central compensation region C1 is decreased. A method of setting the sections of the central compensation region C1 and the gradient compensation regions SG1 and SG2 will be described in detail later with reference to FIG. 7.

FIG. 5 is a view showing an example of a difference in brightness of the horizontal line defect and compensation values applied to the horizontal line defect.

Referring to FIG. 5, the brightness of the horizontal line defect is darkest at the central compensation region C1 located at the central portion of the horizontal line defect in the width direction (y-axis direction) and is gradually increased toward the both edges of the central compensation region C1. In order to compensate for the brightness of the horizontal line defect, the compensation value applied to the horizontal line defect is largest at the central compensation region C1 and is gradually decreased in the gradient compensation regions SG1 and SG2 located at the both edges of the central compensation region C1.

Since the brightness of the central compensation region C1 does not overlap the brightness of the normal display surface, the central compensation region C1 is darkest and a largest compensation value a1 is applied to the central compensation region C1 in the horizontal line defect. The compensation value a1 of the central compensation region C1 is decided to a value for allowing a difference in brightness between the central compensation region C1 and the normal display surface to be invisible to the naked eyes, on the basis of a subjective difference in brightness between the central compensation region C1 and the normal display surface sensed by the naked eyes or a brightness measuring apparatus.

The gradient compensation regions SG1 and SG2 are regions in which the brightness of the central compensation region C1 overlaps the brightness of the normal display surface and are located at the left side (SG1) and the right side (SG2) of the central compensation region in the horizontal line defect. The brightness of each of the gradient compensation regions SG1 and SG2 is similar to that of the central compensation region C1 at a position close to the central compensation region C1 and is similar to that of the normal display surface at a position close to the normal display surface. That is, the gradient compensation regions SG1 and SG2 darken toward the central compensation region C1 and brighten toward a non-overlapping surface of the normal display surface. Each of the gradient compensation regions SG1 and SG2 is divided into a plurality of sections. Here, the width of each section is defined to a value obtained by converting the width-direction lengths (y) of the gradient compensation regions SG1 and SG2 into the number of pixels and dividing the converted length by a multiple of 4. In the gradient compensation regions SG1 and SG2, compensation values b1 to e1 and b1' to e1' are automatically determined to values which are gradually decreased from a section close to the central compensation region C1 to a section close to the non-overlapping surface of the normal display surface. In other words, when the compensation value a1 of the central compensation region C1 is decided, the compensation values b1 to e1 and b1' to e1' applied to the sections of the gradient compensation regions SG1 and SG2 are automatically decided between the compensation value a1 and '0' and satisfy perfect bilateral symmetry. The number of sections of the gradient compensation regions SG1 and SG2 is increased as the compensation value a1 of the central compensation region C1 is increased and is decreased as the compensation value a1 of the central compensation region C1 is decreased. A method of setting the sections of the central compensation region C1 and the gradient compensation regions SG1 and SG2 will be described in detail later with reference to FIG. 7.

The compensation values of the vertical line defect and the horizontal line defect are optimized according to gray levels, in consideration of visibility of brightness and chromaticity sensed by the naked eyes and gamma characteristics of a data voltage supplied to the display panel. The visibility of brightness and chromaticity sensed by the naked eyes and the gamma characteristics of the data voltage varies according to the characteristics of the panel.

Figure 6:
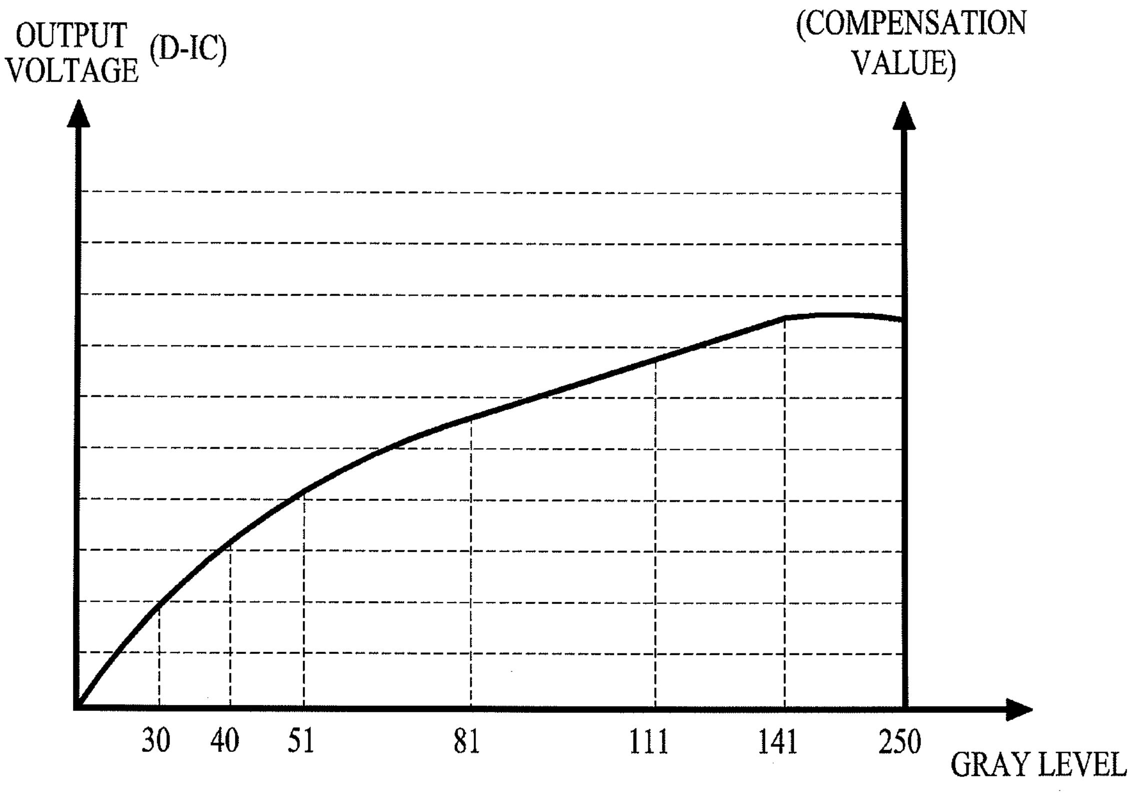
FIG. 6 is a view showing the compensation values optimized according to gray levels and data voltages output from a data driving circuit in correspondence with the compensation values.

FIG. 6 is a view showing an example of the compensation voltage optimized according to the gray level and the data voltage output from a data driving circuit corresponding to the compensation value.

Referring to FIG. 6, in the present embodiments, the gray level may be divided into three gray level sections including a high gray level section, a middle gray level section and a low gray level section and the compensation is optimized in the unit of the gray level sections. If a highest brightness which can be represented by the display panel, that is, peak white brightness, is 100%, the brightness of the high gray level section is about 55% to 100% of the peak white brightness, the brightness of the middle gray level section is about 20% to 55% of the peak white brightness, and the brightness of the low gray level section is about 20% or less of the peak white brightness. For example, when digital video data of one pixel is configured by R, G and B with 8 bits and represents 256 gray levels, high gray levels of more than 140 are set to the high gray level section, middle gray levels of 51 to 140 are set to the middle gray level section, and low gray levels of 50 or less are set to the low gray level section.

A significant difference in brightness between the normal display surface and the display defect in the high gray level section is visually less than that in the middle gray level section. The significant difference is defined as a threshold for allowing a difference in brightness and chromaticity to be visually sensed. In the high gray level section, the significant difference between gray levels is small. Accordingly, the high gray level includes a wide gray level range. In the high gray level section, a gray level range of 251 or more has a restricted compensation value. In addition, although the compensation value is applied, since the difference in brightness and chromaticity is not visually sensed, the compensation value does not need to be applied. The compensation value of the high gray level section should be larger than that of the middle gray level section so as to avoid reversion in brightness and chromaticity.

The middle gray level section has a significant difference larger than that of the high gray level section, but is applied with a compensation value smaller than that of the high gray level section. The middle gray level section is divided into a plurality of sub sections to which different compensation values are applied. In the middle gray level section, a first sub section includes gray levels of 51 to 80, a second sub section includes gray levels 81 to 110 and a third sub section includes gray levels 111 to 140. The middle gray level section may be divided into the sub sections at the same interval, since a variation in brightness between the gray levels is linear.

Since the low gray level section has a rapid gradient corresponding to the variation in brightness between the gray levels, the gray level ranges of sub sections thereof are narrower than those of the high gray level section and the middle gray level section. In the low gray level section, a first sub section includes gray levels of 30 to 39 and a second sub section includes gray levels of 40 to 50. In the lowest gray levels of less than 30, that is, the lowest gray levels having a brightness which is about 12% or less of the peak white brightness, the compensation value does not need to be applied according to the degree that a display defect appears in the middle gray level. For example, if a display defect strongly appears at a reference gray level of 127, the compensation value is applied to even the lowest gray level of less than 30. In contrast, if a display defect weakly appears at the reference gray level of 127, the display defect may hardly appear even in the lowest gray level of less than 30. In this case, the compensation value does not need to be applied to the lowest gray levels of less than 30.

The compensation values are independently applied to the gray level sections according to a failure level of the central compensation region C1 at the reference gray level of 127. The compensation value of the central compensation region C1 is set to a value larger by a ⅛ gray level than that of a reference gray level section of 111 to 140 including the reference gray level of 127 in a highest gray level section higher than the reference gray level section, and is set to a value which is decreased stepwise at an interval of a ⅛ gray level or a ⅜ gray level in the low gray level sections, lower than the reference gray level section of 111 to 140. If the central compensation region C1 has a high failure level and the compensation value of the central compensation region C1 is set to the ⅛ gray level, a new lowest gray level section of 20 to 29, to which the compensation value is applied, is added and the ⅛ gray level is set as the compensation value of the central compensation region C1 in the lowest gray level section. If the central compensation region C1 has a higher failure level and the compensation value of the central compensation region C1 is set to the 3/8 gray level, new lowest gray level sections of 20 to 29 and 10 to 19, to which the compensation value is applied, are added, the 2/8 gray level is set as the compensation value of the central compensation region C1 in the gray level section of 20 to 29, and the 1/8 gray level is set as the compensation value of the central compensation region C1 in the gray level section of 10 to 19.

The compensation values b1 to e1 and b1' to e1' applied to the sections of the gradient compensation regions SG1 and SG2 are set to values which vary stepwise between the compensation value of the central compensation region C1 and '0' in the gray level sections and satisfy perfect bilateral symmetry between the left and right sides of the central compensation region C1.

Figure 7:
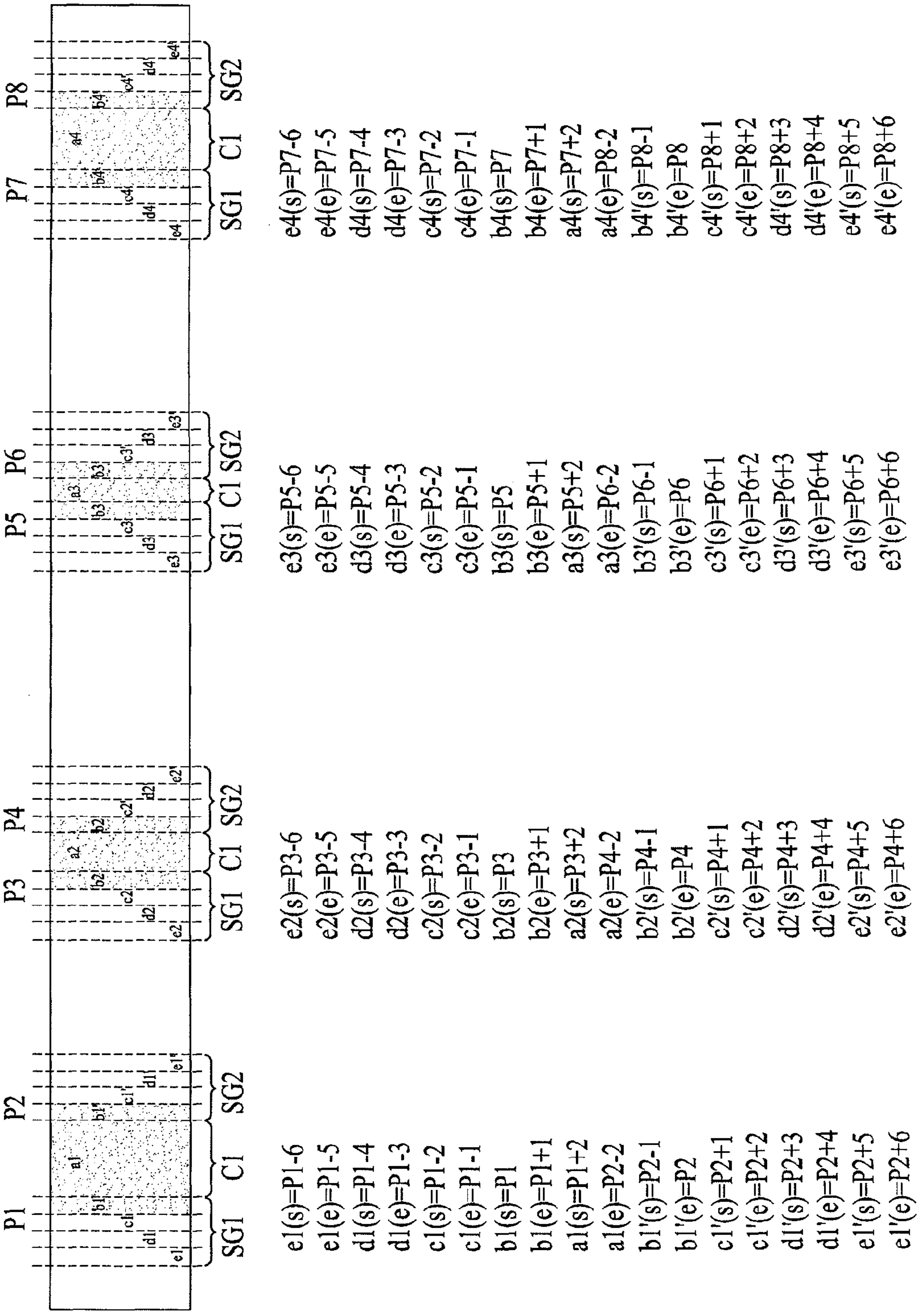
FIG. 7 is a view showing an example of a method of setting sections of a central compensation region C1 and gradient compensation regions SG1 and SG2.

FIG. 7 is a view showing an example of a method of setting the sections of the central compensation region C1 and the gradient compensation regions SG1 and SG2.

Referring to FIG. 7, in order to decide the compensation value of the line defect, references for setting the sections of the central compensation region C1 and the gradient compensation regions SG1 and SG2 are input reference positional coordinate values P1 to P8 of the display defect. The reference positional coordinate values P1 to P8 become x coordinates if the display defect is the vertical line defect and become y coordinates if the display defect is the horizontal line defect. For example, as shown in FIG. 3, if the vertical line defect appears in a first overlapping portion B1 of the lens assembly 10, one section is automatically set at the right side of the input x coordinate value P1 and three sections are automatically set at the left side thereof, in the gradient compensation region SG1. Symmetrically, one section is automatically set at the left side of the input x coordinate value P2 and three sections are automatically set at the right side thereof in the gradient compensation region SG1. Each of the sections has a start point s and an end point e and the width of each of the sections is defined to a value obtained by converting the width-direction lengths of the gradient compensation regions SG1 and SG2 into the number of pixels and dividing the converted lengths into a multiple of 4. Since the width-direction lengths of the gradient compensation regions SG1 and SG2 are equally set, the widths of the sections of the gradient compensation region SG1 are identical.

By such a method, if the vertical line defects appear in second to fourth overlapping portions B2 to B4 of the lens assembly 10, one section is automatically set at the right sides of the input x coordinate values P3, P5 and P7 and three sections are automatically set at the left sides thereof in the gradient compensation region SG1. Symmetrically, one section is automatically set at the left sides of the input x coordinate values P4, P6 and P8 and three sections are automatically set at the right sides thereof in the gradient compensation region SG1.

As described above, in order to divide the display defect into a gray level region and a positional region and independently and differently compensate for the display defect according to the levels of defects, the compensation values are previously set by an experiment according to the gray levels, the positions and the levels of defects. The compensation values are decided by automatically selecting an optimal compensation value according to the input levels of defects. The compensation values are used for compensating the display defect which appears with a brightness lower than that of the normal display surface and are added to digital video data to be displayed in the display defect.

Meanwhile, the display defect includes a surface defect and a surface/line mixing defect, in addition to the vertical line defect and the horizontal line defect. Although the vertical line defect or the horizontal line defect darker than the normal display surface is described, the display defect may include a display defect brighter than the normal display surface. Compensation values for compensating for the brightness of the brighter display defect are decided so as to decrease the difference in brightness between the normal display surface and the display defect according to the failure level of the display defect on the basis of the reference gray level section and the central compensation region, similar to the line defect of the above-described embodiment, and are subtracted from the digital video data to be displayed in the brighter display defect.

Such compensation values may be a decimal fraction less than an integer plus 1, the compensation value of an integer is added to or subtracted from the digital video data using a general bit adder or subtracter, and the compensation value of a decimal fraction is added to or subtracted from the digital video data using a frame rate control (hereinafter, referred to as "FRC") using a dither pattern.

Figure 8:
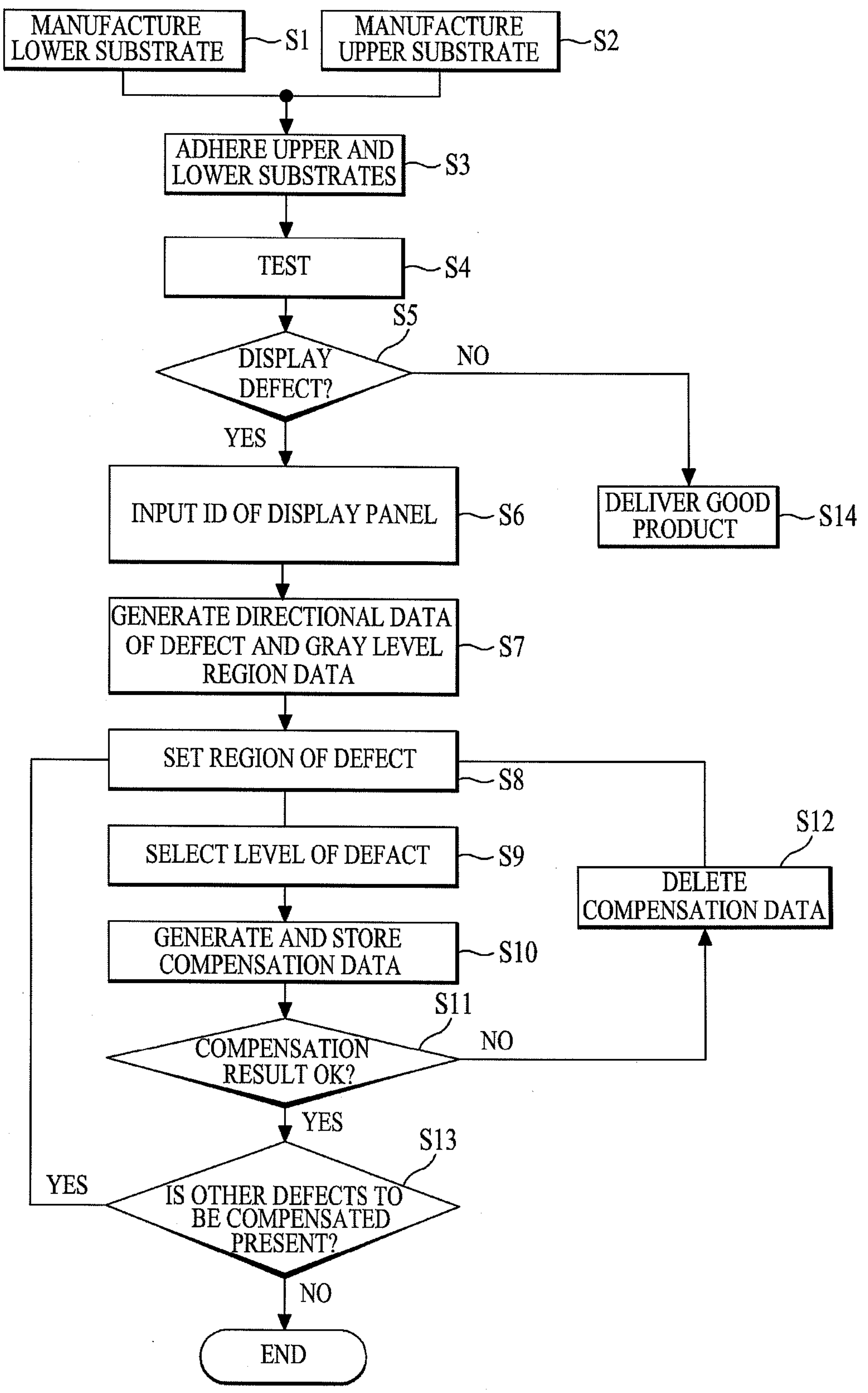
FIG. 8 is a flowchart illustrating a method of manufacturing a flat panel display according to an embodiment of the present disclosure.
Figure 9:
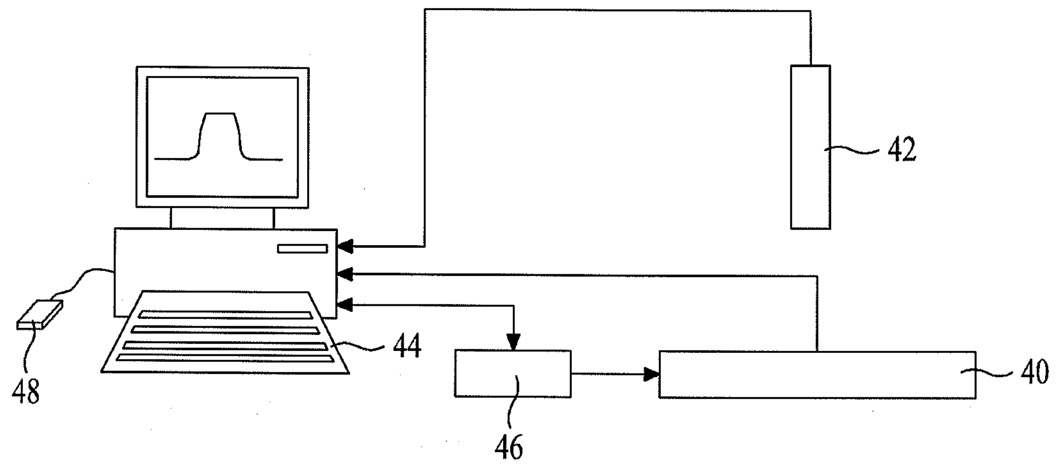
FIG. 9 is a view showing a system for analyzing a display defect and deciding a compensation value, which is used in the manufacturing method shown in FIG. 8.

FIG. 8 is a flowchart illustrating a method of manufacturing a flat panel display according to the embodiment. FIG. 9 is a view showing a system for analyzing a display defect and deciding a compensation value, which is used in the manufacturing method shown in FIG. 8.

Referring to FIGS. 8 and 9, in the method of manufacturing the flat panel display according to the embodiment, an upper substrate and a low substrate are manufactured and are adhered to each other using a sealant or frit glass (S1, S2 and S3). The upper substrate and the lower substrate may be manufactured in various forms according to a display panel 40. For example, in a liquid crystal panel, a color filer, a black matrix, a common electrode, an upper alignment film and so on may be formed on the upper substrate and data lines, gate lines, TFTs, pixel electrodes, a lower alignment film, a column spacer and so on may be formed on the lower substrate. In a plasma display panel, address electrodes, a lower dielectric, a barrier rib, a fluorescent material and so on may be formed on the lower substrate and an upper dielectric, an MgO protective film and a pair of sustain electrodes may be formed on the upper substrate.

In a process of testing the flat panel display, test data having gray levels is applied to the flat panel display 40 so as to display test data according to the gray levels and the brightness and chromaticity of the entire display surface are measured by an electrical test and/or a visual test using a sensing device 42 shown in FIG. 9 with respect to the display state of the test data (S4). If a display defect is found in the flat display panel in the testing process (S5), a barcode type model identification (ID) formed on the display panel is read using a barcode reader and directional data of a display defect (defect) and gray level region data of the display panel are automatically generated (S6 and S7). The model ID includes the size, the resolution and the pitch between cells of the display panel. The directional data of the defect is information indicating whether the defect appears on the display panel in the vertical direction or the horizontal direction. The defect which appears in the vertical direction includes a stitch defect, a vertical dim and a vertical line and the defect which appears in the horizontal direction includes a horizontal dim and a horizontal line. The gray level region data is information indicating how gray level regions of 0 to 255 are divided and different compensations are performed.

In the present disclosure, positional data of each pixel in the display defect is automatically decided according to an input reference coordinate value as shown in FIG. 7 and a compensation value for compensating the brightness of the display defect of each gray level is decided and stored according to information on the level of defect (S8, S9 and S10). The level of defect indicates a difference in brightness between the display defect and the normal display surface. If the compensation value of the central compensation region of the display defect is decided according to the information on the level of defect, the compensation values applied to the sections of the gradient compensation regions are automatically decided between the compensation value of the central compensation region and '0'. Similar to the central compensation region, the gradient compensation regions should be optimized according to the gray levels. The positional data indicating the positions of the pixels of the decided display defect and the compensation values of the display defect are stored in a memory through a user connector and a ROM writer.

It is determined whether a display defect appears after adding/subtracting the compensation values stored in the memory to/from test data to be displayed at the pixels of the display defect (S11). If it is determined that the display defect still appears, then the stored compensation data is deleted (S12) and the steps S8 to S10 are performed again. In contrast, if it is determined that the display defect does not appear, then the compensation values at that time are decided as optimized compensation values.

Subsequently, it is determined whether other display defects to be compensated are present (S13). If it is determined that the other display defects are present, the steps S8 to S12 are performed again.

If it is determined that the display defect does not appear in the entire display surface in the step S5, the flat panel display is determined to a good product and is delivered (S14).

The steps S7 to S13 may be implemented by a compensation program executed by a program executer 46 shown in FIG. 9. The compensation program automatically decides the positional data of the display defect and the compensation values according to the gray levels of the display defect using the input ID of the display panel and the reference coordinate value and the level of the display defect, as described above.

The system for analyzing the display defect and deciding the compensation value includes the sensing device 42 for sensing the brightness and the chromaticity of the flat display panel 40, a computer 44 for supplying data to the flat display panel 40 and analyzing the brightness and the chromaticity of the flat display panel 40 from a signal output from the sensing device 42, the program executer 46 for executing the compensation program on the basis of the ID of the display panel and the information on the display defect input through the computer 44, and the memory 48 for storing the positional data and the compensation value of the display defect decided by the execution of the compensation program, as shown in FIG. 9.

The sensing device 42 includes a camera and/or an optical sensor, senses the brightness and the chromaticity of the test image displayed on the flat display panel 40, generates a voltage or current, converts the voltage or current to digital sensing data, and supplies the digital sensing data to the computer 44.

The computer 44 supplies the test data of each gray level to a driving circuit of the flat display panel and determines the brightness and the chromaticity of the test image of each gray level with respect to the entire display surface of the display panel 40 according to the digital sensing data inputted from the sensing device 42. The computer 44 operates the program executer 46 if the display defect of the display panel 40 is sensed by the sensing device 42 or the ID of the panel and the information on the display defect are input by the subjective judgment of a manager. The computer 44 observes a variation in brightness and chromaticity of the display defect, determines whether a difference in brightness between the display defect and the normal display surface is less than a predetermined threshold, and stores the compensation value at that time as an optimized compensation value in the memory 46 together with the positional data. Here, the threshold is experimentally decided such that the difference in brightness between the line defect and the normal display surface is invisible to the naked eyes at the same gray level.

The program executer 46 executes the compensation program using the ID of the panel and the information on the display defect input by the manager and automatically decides the positional data of the display defect and the compensation value of each gray level of the display defect. The program executer 46 may be included in the driving circuit of the display panel 40.

The memory 48 stores and supplies the positional data of the display defect and the compensation value of each gray level to the driving circuit of the display panel 40, under the control of the computer 44.

Figure 10:
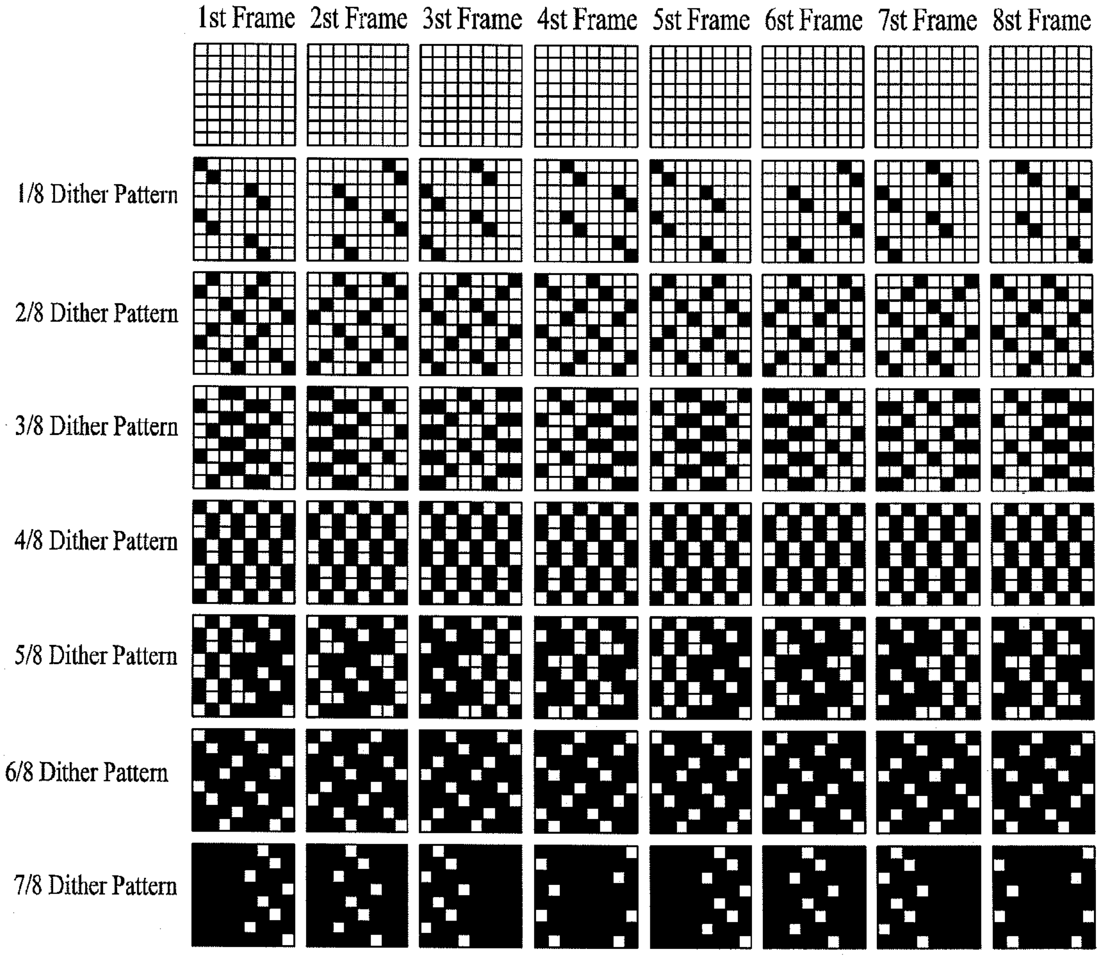
FIG. 10 is a view showing an example of a dither pattern of a frame rate control (FRC) representing a fine compensation value of less than '1' among the compensation values.

FIG. 10 is a view showing an example of the dither pattern of the FRC representing a fine compensation value of less than '1' among the above-described compensation values.

Referring to FIG. 10, the FRC has a size of 8 pixels×8 pixels. The number of pixels to which '1' is added varies according to the compensation values, and a ⅛ dither pattern to a ⅞ dither pattern representing the compensation value corresponding to a gray level of a decimal fraction of less than 1 are used.

The ⅛ dither pattern sets eight pixels, to which '1' is added, among 64 pixels and represents a compensation value corresponding to a ⅛ (=0.125) gray level, the 2/8 dither pattern sets 16 pixels, to which '1' is added, among the 64 pixels and represents a compensation value corresponding to a 2/8 (=0.250) gray level, the ⅜ dither pattern sets 24 pixels, to which '1' is added, among the 64 pixels and represents a compensation value corresponding to a ⅜ (=0.375) gray level, the 4/8 dither pattern sets 32 pixels, to which '1' is added, among the 64 pixels and represents a compensation value corresponding to a 4/8 (=0.500) gray level, the ⅝ dither pattern sets 40 pixels, to which '1' is added, among the 64 pixels and represents a compensation value corresponding to a ⅝ (=0.625) gray level, the 6/8 dither pattern sets 48 pixels, to which '1' is added, among the 64 pixels and represents a compensation value corresponding to a 6/8 (=0.750) gray level, and the ⅞ dither pattern sets 56 pixels, to which '1' is added, among the 64 pixels and represents a compensation value corresponding to a ⅞ (=0.875) gray level. In each of the dither patterns, the positions of the pixels to which '1' is added vary according to frame periods.

Figure 11:
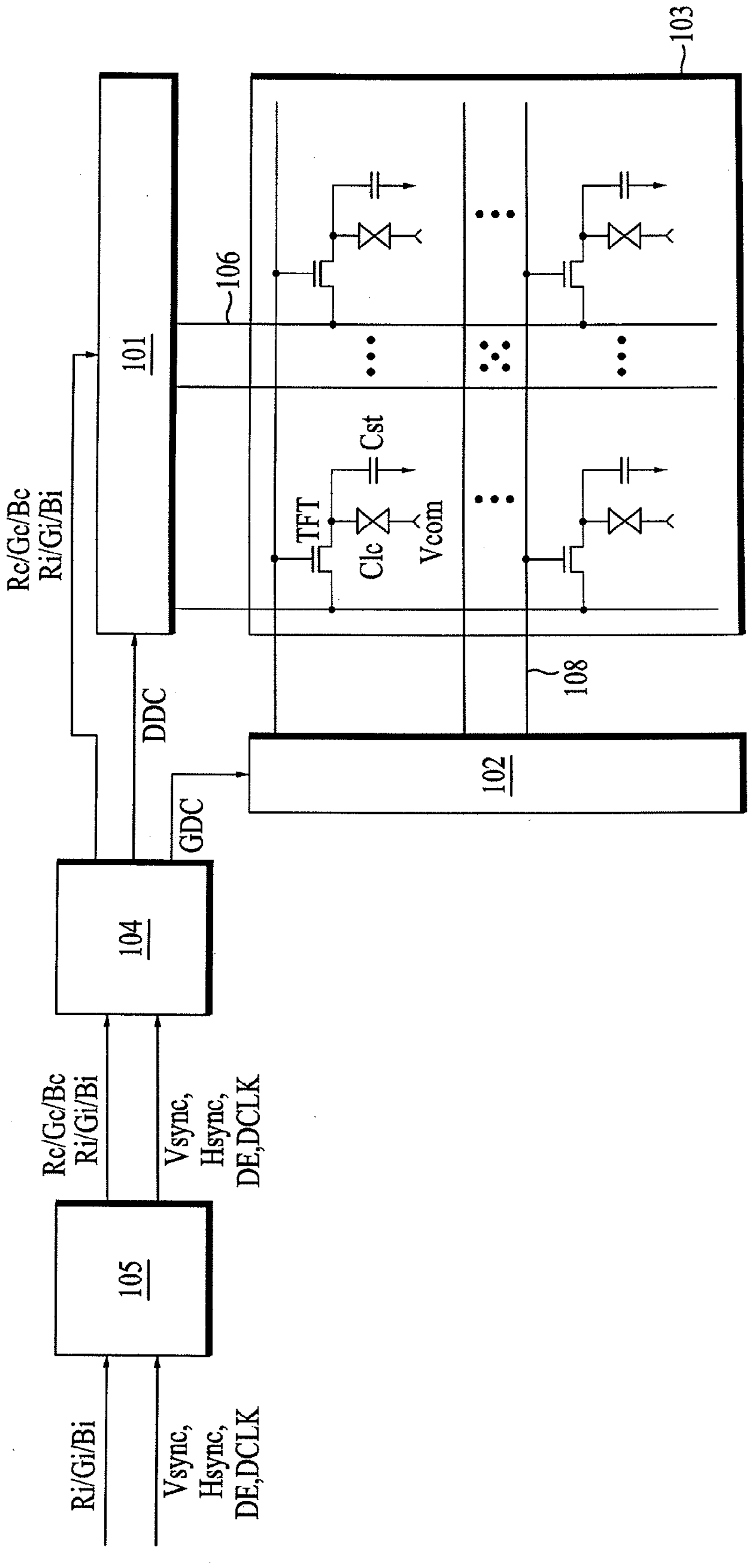
FIG. 11 is a block diagram showing the flat panel display according to the embodiment of the present disclosure.

FIG. 11 is a view showing a flat panel display according to the embodiment. A liquid crystal display which is an example of the flat panel display will be described.

Referring to FIG. 11, the flat panel includes a display panel includes a display panel 103 on which data lines 106 and gate lines 108 intersect each other and thin film transistors (TFTs) for driving liquid crystal cells Clc are formed at the intersections thereof, a compensation circuit 105 for modulating digital video data Ri/Gi/Bi, which will be displayed in a display defect using compensation values which are previously stored, a data driving circuit 101 for supplying the modulated data Rc/Gc/Bc to the data lines 106, a gate driving circuit 102 for sequentially supplying scan signals to the gate lines 108, and a timing controller 104 for controlling the driving circuits 101 and 102.

The display panel 103 includes liquid crystal molecules filled between two substrates (a TFT substrate and a color filter substrate). The data lines 106 and gate lines 108 which are formed on the TFT substrate are perpendicular to each other. The TFTs formed at the intersections between the data lines 106 and the gate lines 108 supply data voltages, which are supplied via the data lines 106 in response to the scan signals from the gate lines 108, to pixel electrodes of the liquid crystal cells Clc. On the color filter substrate, a black matrix and a color filter, both of which are not shown, are formed. A common electrode to which a common voltage Vcom is supplied is formed on the TFT substrate in an in-plane switching (IPS) mode or a fringe field switching (FFS) mode and is formed on the color filter substrate in a twisted nematic (TN) mode, an optical compensated bend (OCB) mode, and a vertically alignment (VA) mode. Polarization plates having polarization axes perpendicular to each other are formed on the TFT substrate and the color filter substrate, respectively.

The compensation circuit 105 inputs the digital video data Ri/Gi/Bi from a system interface, adds/subtracts the compensation values which are previously stored to/from the digital video data Ri/Gi/Bi which will be displayed in the pixels of the display defect, and outputs the adjusted digital video data Rc/Gc/Bc and the unmodulated data Ri/Gi/Bi which will be displayed on the reference surface.

The timing controller 104 supplies the digital video data Rc/Gc/Bc and Ri/Gi/Bi inputted from the compensation circuit 105 to the data driving circuit 101 in synchronization with a dot clock DCLK and generates a gate control signal GDC for controlling the gate driving circuit 102 and a data control signal DDC for controlling the data driving circuit 101, using vertical and horizontal synchronization signals Vsync and Hsync, a data enable signal DE and the dot clock DCLK. The compensation circuit 105 and the timing controller 104 may be integrated to a single chip.

The data driving circuit 101 converts the digital video data Rc/Gc/Bc and Ri/Gi/Bi inputted from the timing controller 104 into analog gamma compensation voltages and supplies the analog gamma compensation voltages to the data lines 106 as the data voltages.

The gate driving circuit 102 sequentially supplies the scan signals for selecting horizontal lines, to which the data voltages will be supplied, to the gate lines 108.

Figure 12:
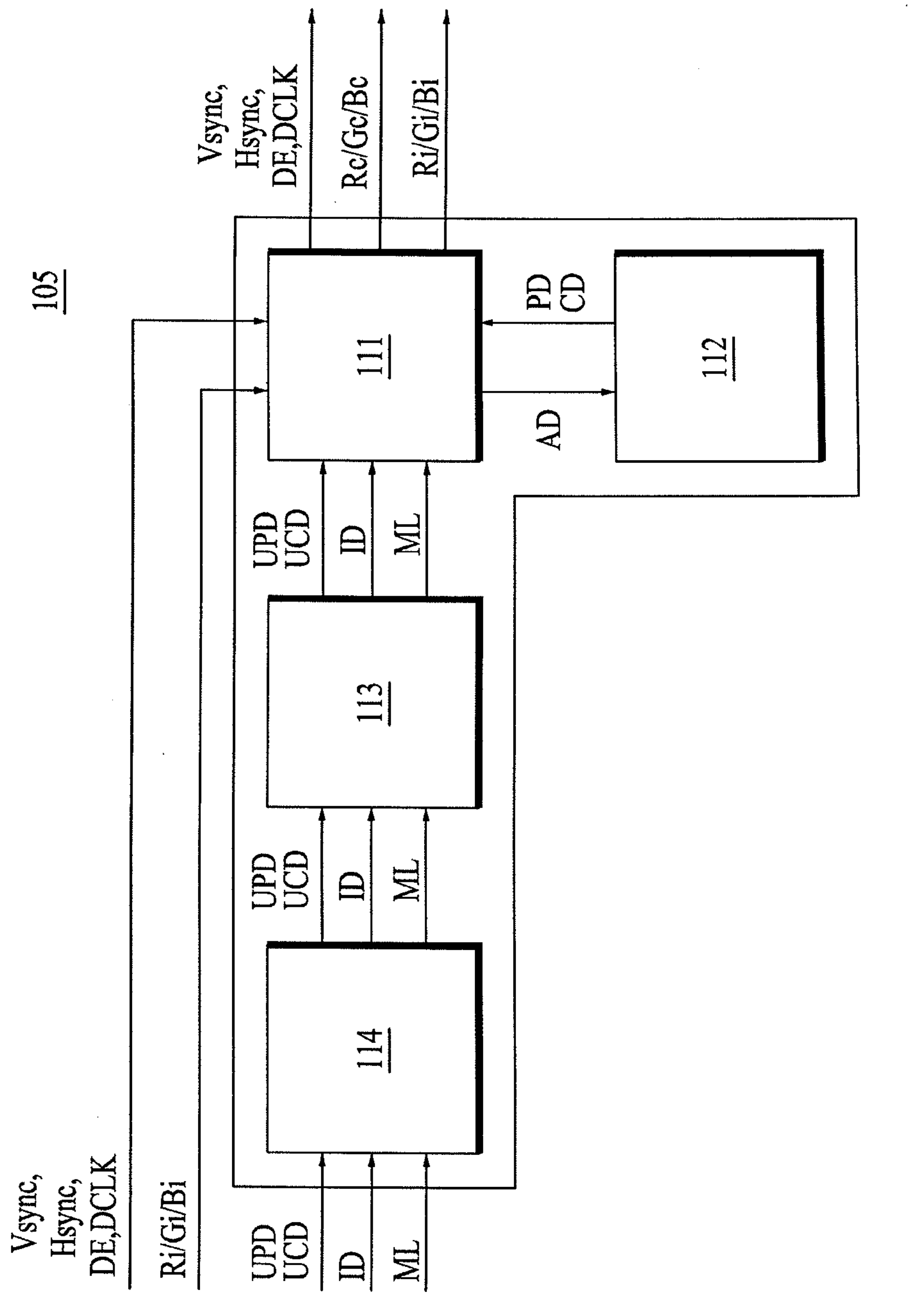
FIG. 12 is a block diagram showing in detail a compensation circuit 105 shown in FIG. 11.

FIG. 12 is a view showing in detail the compensation circuit 105.

Referring to FIG. 12, the compensation circuit 105 includes a FRC control unit 111, an EEPROM 112, a register 113, and an interface circuit 114.

The FRC control unit 111 executes the compensation program shown in FIG. 8 using the ID of the display panel and the information ML on the display defect input through the interface circuit 114, and decides and stores the positional information PD of the display defect and the compensation values CD of the respective gray levels in the EEPROM 112. The FRC control unit 111 determines the display positions of the digital video data Ri, Bi and Gi according to the vertical and horizontal synchronization signals Vsync and Hsync, the data enable signal DE and the dot clock DCLK, compares the result of determining the positions with the positional information from the EEPROM 112, and detects the digital video data Ri/Bi/Gi which will be displayed in the display defect. The FRC control unit 111 supplies the digital video data Ri, Bi and Gi which will be displayed in the display defect to the EEPROM 112 as a read address AD and adds/subtracts the compensation values CD of the respective gray level output from the EEPROM 112 to/from the digital video data Ri/Bi/Gi which will be displayed in the display defect in response to the read address AD. Here, the FRC control unit 111 temporally and spatially disperses the compensation values according to a predetermined dither patter as shown in FIG. 7, adds/subtracts the compensation value of less than one gray level to/from the digital video data Ri/Bi/Gi in the unit of the dither pattern, and adds/subtracts the compensations values of integers of one gray level or more to/from the digital video data in the unit of the pixel.

The EEPROM 112 is a memory for storing the positional data PD indicating the pixels of the display defect and the compensation values CD in the form of a lookup table. The positional data PD and the compensation values CD stored in the EEPROM 112 may be updated by an electric signal applied from the external computer 44 through the interface circuit 114.

The interface circuit 114 performs communication between the compensation circuit 105 and the external system and is designed according to a communication standard protocol such as $I^2C$. The positional data PD and the compensation values CD stored in the EEPROM 112 are requested to be updated due to a process variation and a difference between models. A user inputs user positional data UPD and user compensation values UCD to be updated through the external system. The computer 44 can read and correct the data stored in the EEPROM 112 through the interface circuit 114 at the time of request.

The register 113 temporarily stores user data UPD and CD transmitted through the interface circuit 114 in order to update the positional data PD and the compensation data CD stored in the EEPROM 112.

Such a liquid crystal display is applicable to other flat panel display without alteration. For example, the liquid crystal panel 103 may be replaced with a field emission display, a plasma display panel and an organic light emitting diode.

As described above, in accordance with a method and apparatus for compensating for a display defect of a flat panel display of the embodiment, since compensation values are added/subtracted to/from digital video data to be displayed in a display defect which appears due to a process error so as to electrically compensate for the display defect, it is possible to improve the picture quality of the display defect to at least a reference level of a good product.

Further, in accordance with the method and apparatus for compensating for the display defect of the flat panel display of the embodiment, since a compensation program is executed using an ID of a panel and information on a display defect, compensation data according to the characteristics of the display defect is automatically generated, and the display defect is electrically compensated for using the compensation data, it is possible to improve the picture quality.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of compensating for a display defect of a flat panel display, the method comprising:

reading identification information of a display panel using a barcode reader, wherein the identification information is a model identification, formed with a barcode type on the display panel, and includes the size, the resolution and the pitch between cells of the display panel;

automatically generating predetermined directional data of the display defect and gray level region data of the display panel according to the identification information, wherein the directional data indicates whether the display defect appears on the display panel in a vertical direction or a horizontal direction, inputting the first information including a coordinate value indicating the position of the display defect according to the directional data;

inputting the second information including defect level information indicating the degree of the display defect;

generating positional information indicating the position of the display defect and the form of the display defect of the display panel on the basis of first input information and the identification information;

generating a compensation value for compensating the degree of the display defect on the basis of second input information;

storing the positional information and the compensation value in a memory; and reading the positional information and the compensation value from the memory, modulating data to be displayed at the position of the display defect by the compensation value, and displaying the modulated data on the display panel, wherein the display defect includes a central compensation region and gradient compensation regions, which are located at both sides of the central compensation region, positioned, wherein the number of the gradient compensation regions is adjusted according to the compensation value of the central compensation region, wherein the number of the gradient compensation regions increased as the compensation value of the central compensation region is increased and is decreased as the compensation value of the central compensation region is decreased, and wherein a width of each gradient compensation region is defined to the number of pixels divided by a multiple of 4.

2. The method according to claim 1, wherein the compensation value is optimized so as to vary according to a gray level region of the data to be displayed at the position of the display defect.

3. The method according to claim 2, wherein:

the gray level region includes a middle gray level section, a low gray level section having gray levels lower than those of the middle gray level section and a high gray level section having gray levels higher than those of the middle gray level section, and the compensation value of the high gray level section is higher than that of the middle gray level section and the compensation value of the middle gray level section is higher than that of the low gray level section.

4. The method according to claim 1, wherein the coordinate value indicates a start point and an end point of the display defect.

5. The method according to claim 4, wherein the defect level information varies according to the degree of the display defect.

6. The method according to claim 5, wherein the positional information of the display defect includes positional information of a left gradient compensation region which is decided on the basis of the start point of the display defect, positional information of a right gradient compensation region which is decided on the basis of the end point of the display defect, and positional information of a central compensation region interposed between the left gradient compensation region and the right gradient compensation region.

7. The method according to claim 6, wherein the positional information of the left gradient compensation region includes positional information indicating sections positioned at the right side of the start point of the display defect in the left gradient compensation region and positional information indicating sections positioned at the left side of the start point of the display defect in the left gradient compensation region.

8. The method according to claim 6, wherein the positional information of the right gradient compensation region includes positional information indicating sections positioned at the right side of the end point of the display defect in the right gradient compensation region and positional information indicating sections positioned at the left side of the end point of the display defect in the right gradient compensation region.

9. The method according to claim 6, wherein:

the compensation value of the central compensation region is decided to a highest value in the display defect according to the defect level information and the compensation values of the gradient compensation regions are decided to a value between the compensation value of the central compensation region and 0, and the gradient compensation regions are virtually divided into a plurality of sections to which the compensation values are respectively applied and the compensation values of the sections gradually vary.

10. An apparatus for compensating for a display defect of a flat panel display, the apparatus comprising:

a display panel;

an input device for inputting first information including a coordinate value indicating the position of the display defect and second information including defect level information indicating the degree of the display defect;

a program executer which reads an identification information of the display panel, generates positional information indicating the position of the display defect and the form of the display defect of the display panel on the basis of the first input information and the identification information, and generates a compensation value for compensating the display defect on the basis of the second input information;

a memory which stores the generated positional information and the compensation value;

a compensation unit which reads the information from the memory and modulates data to be displayed at the position of the display defect by the compensation value; and a driving unit which displays the data adjusted by the compensation value on the display panel, wherein the program executer automatically generates predetermined directional data of the display defect and gray level region data of the display panel according to the identification information, wherein the identification information is a model identification, formed with a barcode type on the display panel, and includes the size, the resolution and the pitch between cells of the display panel, wherein the directional data indicates whether the display defect appears on the display panel in a vertical direction or a horizontal direction, wherein the display defect includes a central compensation region and gradient compensation regions, which are located at both sides of the central compensation region, positioned, wherein the number of the gradient compensation regions is adjusted according to the compensation value of the central compensation region, wherein the number of the gradient compensation regions increased as the compensation value of the central compensation region is increased and is decreased as the compensation value of the central compensation region is decreased, and wherein a width of each gradient compensation region is defined to the number of pixels divided by a multiple of 4.

11. The apparatus according to claim 10, wherein the compensation value is optimized so as to vary according to a gray level region of the data to be displayed at the position of the display defect.

12. The apparatus according to claim 11, wherein:

the gray level region includes a middle gray level section, a low gray level section having gray levels lower than those of the middle gray level section and a high gray level section having gray levels higher than those of the middle gray level section, the compensation value of the high gray level section is higher than that of the middle gray level section and the compensation value of the middle gray level section is higher than that of the low gray level section.

13. The apparatus according to claim 10, wherein the coordinate value indicates a start point and an end point of the display defect.

14. The apparatus according to claim 13, wherein the defect level information varies according to the degree of the display defect.

15. The apparatus according to claim 14, wherein the positional information of the display defect includes positional information of a left gradient compensation region which is decided on the basis of the start point of the display defect, positional information of a right gradient compensation region which is decided on the basis of the end point of the display defect, and positional information of a central compensation region interposed between the left gradient compensation region and the right gradient compensation region.

16. The apparatus according to claim 15, wherein the positional information of the left gradient compensation region includes positional information indicating sections positioned at the right side of the start point of the display defect in the left gradient compensation region and positional information indicating sections positioned at the left side of the start point of the display defect in the left gradient compensation region.

17. The apparatus according to claim 15, wherein the positional information of the right gradient compensation region includes positional information indicating sections positioned at the right side of the end point of the display defect in the right gradient compensation region and positional information indicating sections positioned at the left side of the end point of the display defect in the right gradient compensation region.

18. The apparatus according to claim 15, wherein:

the compensation value of the central compensation region is decided to a highest value in the display defect according to the defect level information and the compensation values of the gradient compensation regions are decided to a value between the compensation value of the central compensation region and 0, and the gradient compensation regions are virtually divided into a plurality of sections to which the compensation values are respectively applied and the compensation values of the sections gradually vary.

* * * * *